United States Patent
Diggins

(10) Patent No.: US 7,660,462 B2
(45) Date of Patent: Feb. 9, 2010

(54) METHOD AND APPARATUS FOR ANALYZING IMAGE DATA

(75) Inventor: Jonathan Diggins, Eastleigh (GB)

(73) Assignee: Snell & Wilcox Limited, Hampshire, England (GB)

( * ) Notice: Subject to any disclaimer, the term of this patent is extended or adjusted under 35 U.S.C. 154(b) by 651 days.

(21) Appl. No.: 11/457,211

(22) Filed: Jul. 13, 2006

(65) Prior Publication Data
US 2007/0031030 A1    Feb. 8, 2007

(30) Foreign Application Priority Data
Jul. 14, 2005    (GB)    ................... 0514479.5

(51) Int. Cl.
*G06K 9/00* (2006.01)

(52) U.S. Cl. .................. 382/168; 382/270; 382/271; 382/237; 382/274

(58) Field of Classification Search ........... 382/162, 382/168, 173, 118, 155, 224, 159, 237, 270, 382/271, 274; 345/678, 672, 588, 445, E5.067, 345/E7.067; 375/328, 329; 327/12; 358/159; 702/181
See application file for complete search history.

(56) References Cited

U.S. PATENT DOCUMENTS

| | | | | |
|---|---|---|---|---|
| 4,066,999 | A | | 1/1978 | Spanjersberg ............... 382/160 |
| 4,302,845 | A | * | 11/1981 | McClaughry et al. ....... 375/328 |
| 5,442,406 | A | * | 8/1995 | Altmanshofer et al. ...... 348/588 |
| 5,808,697 | A | * | 9/1998 | Fujimura et al. ............. 348/672 |
| 7,379,568 | B2 | * | 5/2008 | Movellan et al. ............. 382/118 |
| 2004/0090453 | A1 | | 5/2004 | Jasinschi et al. ............. 382/170 |

FOREIGN PATENT DOCUMENTS

| | | |
|---|---|---|
| JP | 9145323 | 6/1997 |
| JP | 11055517 | 2/1999 |
| JP | 2001266143 | 9/2001 |

* cited by examiner

*Primary Examiner*—Anh Hong Do
(74) *Attorney, Agent, or Firm*—Fish & Richardson P.C.

(57) ABSTRACT

A method for the automatic detection of fields or frames in film or video content having similar or substantially the same luminance or color component values, for example to detect black frames. Image sample values are assigned to a sample value range having a signed weight associated therewith, and a contribution to a discriminator function is determined for each sample range depending on the signed weight and the number of input samples in the sample value range. The discriminator function output is then compared with a threshold.

29 Claims, 5 Drawing Sheets

METHOD AND APPARATUS FOR ANALYZING IMAGE DATA

RELATED APPLICATION

Under 35 USC 119, this application claims the benefit of the priority date of UK application No. 0514479.5, filed on Jul. 14, 2005, the contents of which are incorporated herein by reference.

FIELD OF THE INVENTION

The present invention relates to a method and apparatus for analyzing image data. In particular the invention may relate to the automatic detection of fields or frames in film or video content having luminance or color component values that are similar or substantially constant over the field or frame.

BACKGROUND OF THE INVENTION

The monitoring or evaluation of film or video content is an area of growing interest, both for broadcasters and content owner or content management organizations.

In particular, it is desirable for broadcast organizations to be able to monitor the audio-visual content being broadcast to identify, and therefore quickly respond to, problems or errors in the broadcast chain, for example the picture becoming all-black. Typically, previously this has been achieved by a person visually monitoring the program output, or more generally monitoring a number of program outputs, and visually identifying errors in the program output. Clearly this is personnel-intensive and it is desirable to provide automated or semi-automated monitoring and error detection.

In addition, it is increasingly desirable for content owner/management organizations to be able to analyse content and to generate metadata that describes aspects of the content. One example of this technique might be to analyse content to determine the presence of all-black frames and create associated metadata.

One application in which this might be useful is the automated or semi-automated monitoring and error detection as outlined above. Thus, black frames identified in the accompanying metadata are not considered as "errors" on playout of a program content, and only black frames arising from genuine errors, instead of from the program material, give rise to an alarm. This enhances the reliability of the monitoring and error detection.

SUMMARY OF THE INVENTION

The present invention seeks to alleviate at least some disadvantages in the prior art.

In accordance with a first aspect of the invention there is provided a method of analyzing sampled or sub-sampled image data to determine whether image data sample values are close to a defined value, comprising the steps: defining a plurality of sample value ranges, wherein each of the sample value ranges has a signed weight assigned thereto an a sample value range including the defined value therein has a weight of opposite sign from the weight assigned to at least one other sample value range; counting the number of samples having values within each said range and forming a weighted sum of the count values; and comparing the weighted sum with a threshold value, and determining a positive result when the weighted sum is less or more than the threshold value, if the weight assigned to the sample value range including the defined value therein is negative or positive, respectively.

In accordance with a second aspect of the invention there is provided a method of analyzing sampled or sub-sampled image data to determine whether image data sample values are close to a defined value, comprising: forming a weighted sum from relative contributions from a plurality of image data sample value ranges, the relative contribution depending on the number of samples in the range and a signed weight associated with each sample value range, wherein a sample value range including the defined value therein has a weight of opposite sign from the weight associated to at least one other sample value range; and determining a positive result when the weighted sum is less or more than the threshold value, if the weight assigned to the sample value range including the defined value therein is negative or positive, respectively.

In accordance with a third aspect of the invention there is provided a method of analyzing sampled or sub-sampled image data to determine whether image data sample values are close to a defined value comprising: for each image data sample, allocating the image data sample to one of a plurality of sample value ranges; and accumulating a signed weight associated with the allocated sample value range to form a weighted sum, the weight associated with a sample value range including the defined value therein being of opposite sign from the weight assigned to at least one other sample value range; and determining a positive result when the weighted sum for all sample values is less or more than the threshold value, if the weight assigned to the sample value range including the defined value therein is negative or positive, respectively.

In accordance with a fourth aspect of the invention there is provided a program carrier storing processor-implementable instructions for carrying out the method in accordance with the invention.

In accordance with a fifth aspect of the invention there is provided an apparatus for analyzing sampled or sub-sampled image data to determine whether image data sample values are close to a defined value, comprising: means for defining a plurality of sample value ranges, wherein each of the sample value ranges has a signed weight assigned thereto and a sample value range including the defined value therein has a weight of opposite sign from the weight assigned to at least one other sample value range; means for counting the number of samples having values within each said range; and adder for forming a weighted sum of the count values; and a comparator for comparing the weighted sum with a threshold value, and determining a positive result when the weighted sum is less or more than the threshold value, if the weight assigned to the sample value range including the defined value therein is negative or positive, respectively.

In accordance with a sixth aspect of the invention there is provided an apparatus for analyzing sampled or sub-sampled image data to determine whether image data sample values are close to a defined value, comprising: an accumulator means for forming a weighted sum from relative contributions from a plurality of image data sample value ranges, the relative contribution depending on the number of samples in the range and a signed weight associated with each sample value range, wherein a sample value range including the defined value therein has a weight of opposite sign from the weight assigned to at least one other sample value range; and determining means for determining a positive result when the weighted sum is less or more than the threshold value, if the weight assigned to the sample value range including the defined value therein is negative or positive, respectively.

In accordance with a seventh aspect of the invention there is provided an apparatus for analyzing sampled or sub-sampled image data to determine whether image data sample values are close to a defined value comprising: for each image data sample, means for allocating the image data sample to one of a plurality of sample value ranges; and means for accumulating a signed weight associated with the allocated sample value range to form a weighted sum, the weight associated with a sample value range including the defined value therein being of opposite sign from the weight assigned to at least one other sample value range; and means for determining a positive result when the weighted sum is less or more than the threshold value, if the weight assigned to the sample value range including the defined value therein is negative or positive, respectively.

In some embodiments, the weight assigned to the sample value range nearest to, but not including, the defined value has a weight of the same sign as the sample value range including the defined value.

Preferably, weights having opposing sign to the weight associated with the sample value range including the defined value increase in magnitude with closer proximity of the associated sample value range to the said defined value.

BRIEF DESCRIPTION OF THE DRAWINGS

For a better understanding of the present invention, and to show how it may be brought into effect, reference will now be made, by way of example, to the accompanying drawings, in which.

DETAILED DESCRIPTION OF THE INVENTION

Figure 1:
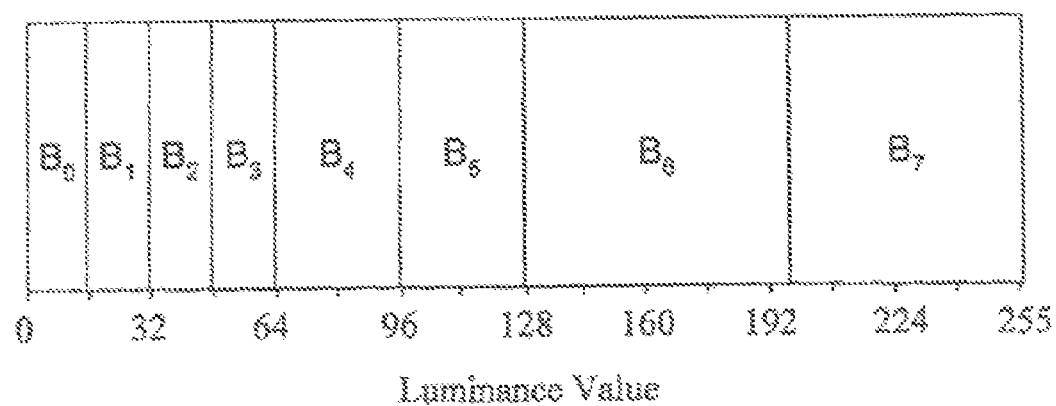
FIG. 1 shows exemplary trial sample value ranges.

An exemplary embodiment of the present invention will now be described with reference to the accompanying drawings.

As will be known to a skilled person, a television or video signal includes both luminance and chrominance information. Historically these quantities have been expressed as eight-bit numbers. ITU Recommendations for digital component systems specify that the luminance signal extends from "black" at level 16 to "white" at level 235; and, two color-difference signals extend from level 16, representing the maximum negative value, to level 240, representing the maximum positive value, with level 128 representing zero. Other values are used in digital composite systems. Modern practice is to use at least ten-bit representation, and equivalence with eight-bit systems is achieved by considering, typically two, low significance bits as "fractional" bits.

In embodiments of the invention the digital word-length may be reduced, for example by truncation or rounding; however in the examples described, eight-bit systems in accordance with ITU coding recommendations are assumed.

The exemplary embodiment will be described in the context of analysis of luminance image data to determine the presence of black fields and therefore in the described embodiment the "defined value" for analysis is black level i.e. level 16 in an 8-bit luminance representation, as will be explained below. However, it will be clear to a skilled person that the analysis of image data in accordance with the invention may be used more generally to determine fields or frames in film or video content having similar or substantially constant luminance or color component values over the field or frame. Thus the invention may also be used to determine an "all-white" field or frame, by comparing luminance values to a "defined value" of white level i.e. level 235; a "grey" field or frame by comparing luminance values to a "defined value" of mid-grey i.e. level 126; or to detect loss of color component or color difference signals by comparing color values or color difference value to level 128 or other defined levels.

In addition, the method of the exemplary embodiment is carried out on all pixel sample values in a field. However, it will be apparent that the concepts described herein can be applied, for example, on a per field-basis or a per frame-basis, or more generally may be applied to the use of any representative sampled or sub-sampled image data. Thus, for example, the invention may be applied to image data representative of the average value over a block, or may be applied using only every nth pixel. References to fields in the following description should be understood accordingly.

In the exemplary embodiment described herein, statistical information about the spread of pixel luminance values in a field across the range of luminance values is used in an efficient manner to determine easily whether or not a particular frame is black. In the exemplary embodiment a technique based on a non-linear histogram is disclosed. In this context the term non-linear is intended to indicate that the sample value ranges, or bins, of the histogram cover a variable number of sample values. In the exemplary embodiment the sample value ranges are clustered around the lower range of pixel luminance values, in order more easily to discriminate a black image from a merely dark action image.

In the described embodiment pixels are allocated to a particular sample value range according to the pixel luminance value. The number of pixels of a frame in a particular sample value range is weighted by a signed weight, associated with the sample value range, to form a sample value range contribution. The contribution associated with each sample value range is then combined with contributions from other sample value ranges to determine whether the field is black.

Most generally, this process can be summarised using a discriminator function having the form:

$$d = T + \sum_{j=0}^{n-1} N_j \times c_j \qquad \text{Equation 1}$$

where d is the discriminator function; T is an arbitrary constant or threshold; $N_j$ is the number of sample values in the $j^{th}$ sample value range; $c_j$ is the weight, or coefficient, associated with the $j^{th}$ sample value range, and there are n sample value ranges.

Generally, one of the sample value ranges will contain the defined value. The coefficients associated with the different sample value ranges are arranged such that the sample value range in which the defined value range falls has a weight with an opposing sign to the sign of the weight associated with at least one other sample value range.

This use of weights with opposing signs means that the result of the discriminator function is effectively a balance between the contribution to the discriminator function made by, on the one hand, sample value ranges having a positive weight and, on the other hand, sample value ranges having a negative weight. The sample value ranges and the magnitude and signs of their corresponding weights can therefore be selected to provide accurate and reliable discrimination.

The sample value ranges and corresponding weights may be selected using a number of different techniques, as will be apparent to a skilled person. In general, it will be advantageous to use a process of training and optimisation to ensure that the sample value ranges and corresponding weights selected provide a reliable discrimination in the situation of interest, for example in discriminating between black frames and merely dark action frames in the exemplary embodiment.

An exemplary weight of generating sample value ranges, or histogram bins, and corresponding weights, or histogram coefficients, will now be described in the context of detection of black frames. In this context, the defined value is luminance value of 16 corresponding to black level in the ITU recommendations.

FIG. 1 shows exemplary trial sample value ranges, with the following bin sizes:

| Bin | Sample value range |
| --- | --- |
| 0 | 0-15 |
| 1 | 16-31 |
| 2 | 32-47 |
| 3 | 48-63 |
| 4 | 64-95 |
| 5 | 96-127 |
| 6 | 128-195 |
| 7 | 196-255 | the sample value ranges shown here are to a certain extent arbitrary; however, it might be expected that small differences in pixel luminance values near the defined value of black level 16 will provide maximum discrimination. As a result, the sample value ranges are narrow around the defined value and are wider further away from the defined value.

Once the sample value ranges have been defined, coefficients are assigned and then optimized using training sequences of black and near-black images. One method of achieving this is, for a set of coefficients, to obtain discriminator function d for each point and use the result in a cost function according to whether the field is black or non-black, and sum the individual cost functions with different weightings to account for their different occurrences in the training sequence.

In the exemplary embodiment the coefficients are calculated initially in floating point precision, with Laplacian regularization. This has the effect of minimizing insignificant coefficients. In the exemplary embodiment, the coefficients are then converted to integers, as shown below, and the less significant coefficients are rounded to zero.

|  | T | $C_0$ | $C_1$ | $C_2$ | $C_3$ |
| --- | --- | --- | --- | --- | --- |
| Floating point coefficients | $9 \times 10^{06}$ | $-8.5 \times 10^{05}$ | $-6.7 \times 10^{05}$ | $-9 \times 10^{05}$ | 1.118479 |
| Rounded integer coefficients | 0 | $-1$ | $-1$ | $-1$ | 18325 |

|  | $C_4$ | $C_5$ | $C_6$ | $C_7$ |
| --- | --- | --- | --- | --- |
| Floating point coefficients | 0.076505 | 0.0 | $1.6 \times 10^{05}$ | $1.51 \times 10^{04}$ |
| Rounded integer coefficients | 1253 | 0 | 0 | 2 |

Thus the following discriminator function results:

$$d = -(B_0 + B_1 + B_2) + 18325 \times B_3 + 1253 \times B_4 + 2 \times B_7$$

or $$d = -N_0 + 18325 \times N_1 + 1253 \times N_2 + 2 \times N_3 + N_4$$

where:

$N_0$=count of input luminance samples $Y<47$ $N_1$=count of input luminance samples $48<Y<63$ $N_2$=count of input luminance samples $64<Y<95$ $N_3$=count of input luminance samples $196<Y<255$ $N_4$=count of input luminance samples not in any of the above ranges.

It is not essential to the operation of the invention to use the count of input luminance samples not in any of the defined ranges, and therefore the use of count $N_4$ is optional.

Thus four sample ranges and their associated weights are defined in this exemplary embodiment. In this exemplary embodiment, the sign of the weight associated with sample range including the defined value (i.e. sample range where $Y<47$) is opposite to the sign of the weight associated with the other defined sample ranges (i.e. sample ranges $48<Y<63$; $64<Y<95$; and $196<Y<255$) Thus "black" is detected when the contribution from the first sample range, having a negative weight, outweighs the contribution from the other sample ranges, all having positive weights. This can be easily determined by the sign of the discriminator function at the end of the representative sample of input values.

Of course, in some embodiments one or more sample value ranges other than the sample range including the defined value may have the same sign as the sample range including the defined value. In particular, the weight assigned to the sample value range nearest to, but not including, the defined value may have a weight of the same sign as the sample value range including the defined value. However, at least one sample range will have an opposing sign, to provide the necessary balancing contribution to the discriminator function.

Optionally in order to reduce the possibility of false positives it may be advantageous to delay notification of black detection until a few fields or frames of black have been detected. This may be achieved, for example, using a state machine and requiring, for example, six black fields to be detected before notification.

The method in accordance with an embodiment will now be described with reference to FIG. 2.

The described method utilizes:

Black flag: indicates that a black image (field, in the exemplary embodiment) has been reliably detected;

Black counter: counts the number of consecutive black images that have been detected;

Pixel counter: counts the number of samples to determine the end of the representative sample: in the exemplary embodiment in which all pixels in a 50 Hz standard definition (SD) field are used as the representative sample, the pixel counter must count 720×288 luminance samples;

Cumulative value d: current value of the discriminator function as described above.

Figure 2:
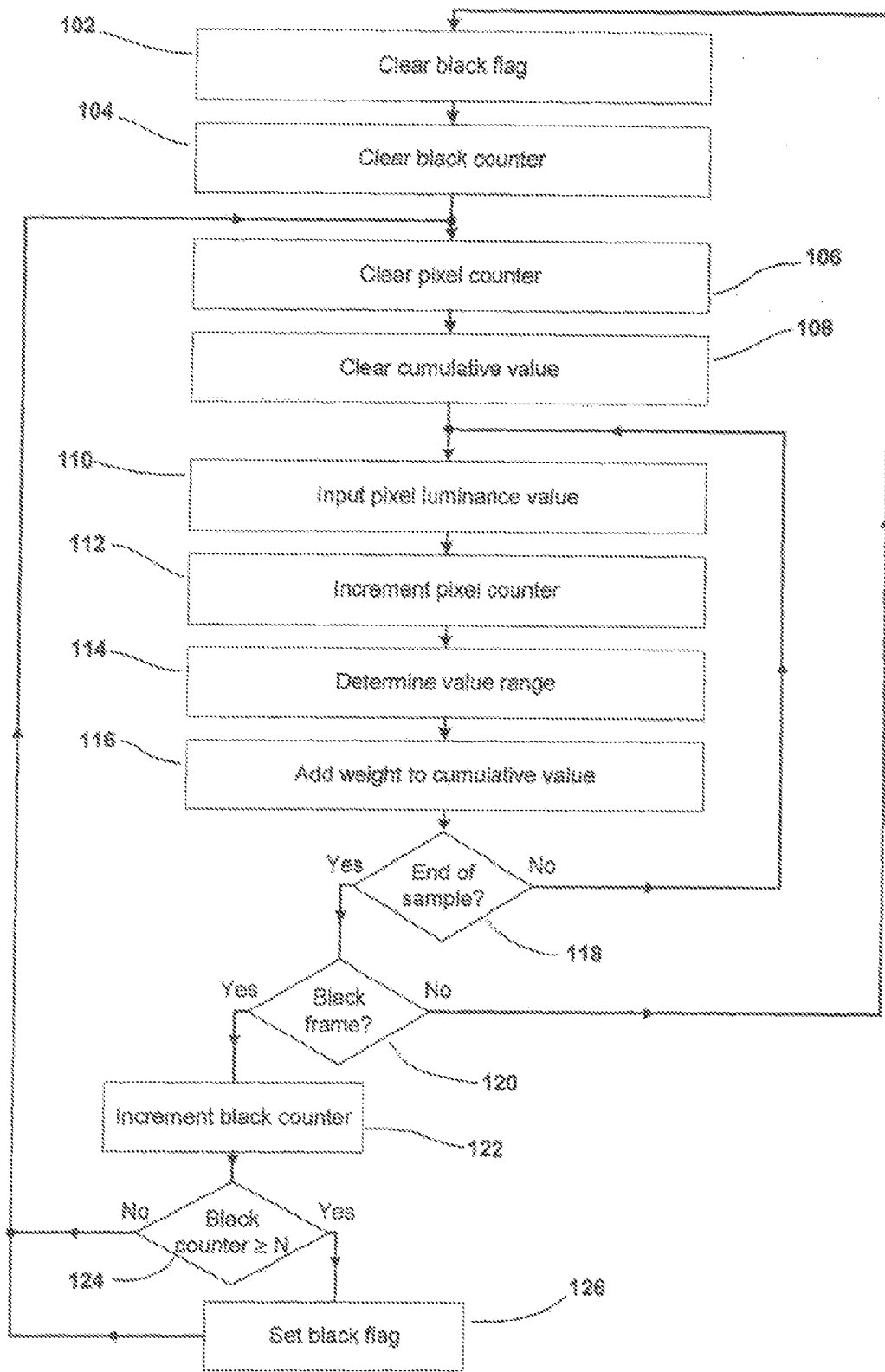
FIG. 2 is a flow chart illustrating a method of an exemplary embodiment.

Thus in accordance with the method shown in FIG. 2, first the black flag is cleared, step 102, and the black counter is cleared, step 104.

Next, at the start of a field, the pixel counter is cleared, step 106 and the cumulative value d is cleared or set to an appropriate offset value, step 108. The offset value, if used, corresponds to constant T in the discriminator function above. As successive pixel luminance values are received, step 110, the pixel counter is incremented, step 112, the pixel luminance values are allocated to a sample value range step 114, and the weight, or bin coefficient, associated with the allocated sample value range is added to the cumulative value d, in step 116.

Next, in step 118 it is determined whether the end of the field has been reached i.e. has the pixel counter counted all pixels in the sample and reached an EndofSample value. For example in the exemplary embodiment where the sample if a 50 Hz standard definition field, the pixel counter is compared with an EndofSample value of 720×288=207,360 in step 118 in order to determine whether a complete field has been considered. If the pixel counter has not yet reached the EndofSample value, step 118—no, steps 110-118 are repeated for successive pixel luminance values.

Once the pixel counter has reached the EndofSample value, step 118—yes, it is determined whether the image is black, step 120, by examining the value of the cumulative value d. Thus in the illustrative method it is determined whether the cumulative value d is greater than or equal to zero, or is less than zero. As indicated above, the choice of the sign of d allocated to black is not material.

If it is determined that the frame is not black, 120—no, the method returns to the beginning and the black flag is cleared, step 102 and the black counter is cleared, step 104, prior to processing of the next field of pixel luminance values in steps 106-118.

If it is determined that the field is black, step 120—yes, the black counter value is incremented, step 122 and the incremented black counter value is compared with a threshold value N in step 124. Clearly, at first, the black counter value will be less than the threshold N, step 124—no, and the method returns to step 106 to evaluate the next field. Successive black fields will, however, cause the black counter value to be incremented in step 122 until the black counter value reaches the threshold value N, step 124—yes, and the black flag is set, step 126.

Thereafter, if successive fields remain black, the black flag will remain set, indicating black has been detected. When the first non-black field is detected, at step 120—no, the method will return to step 102 to clear the black flag and step 104 to clear the black counter before starting consideration of the next field at step 106.

Figure 3:
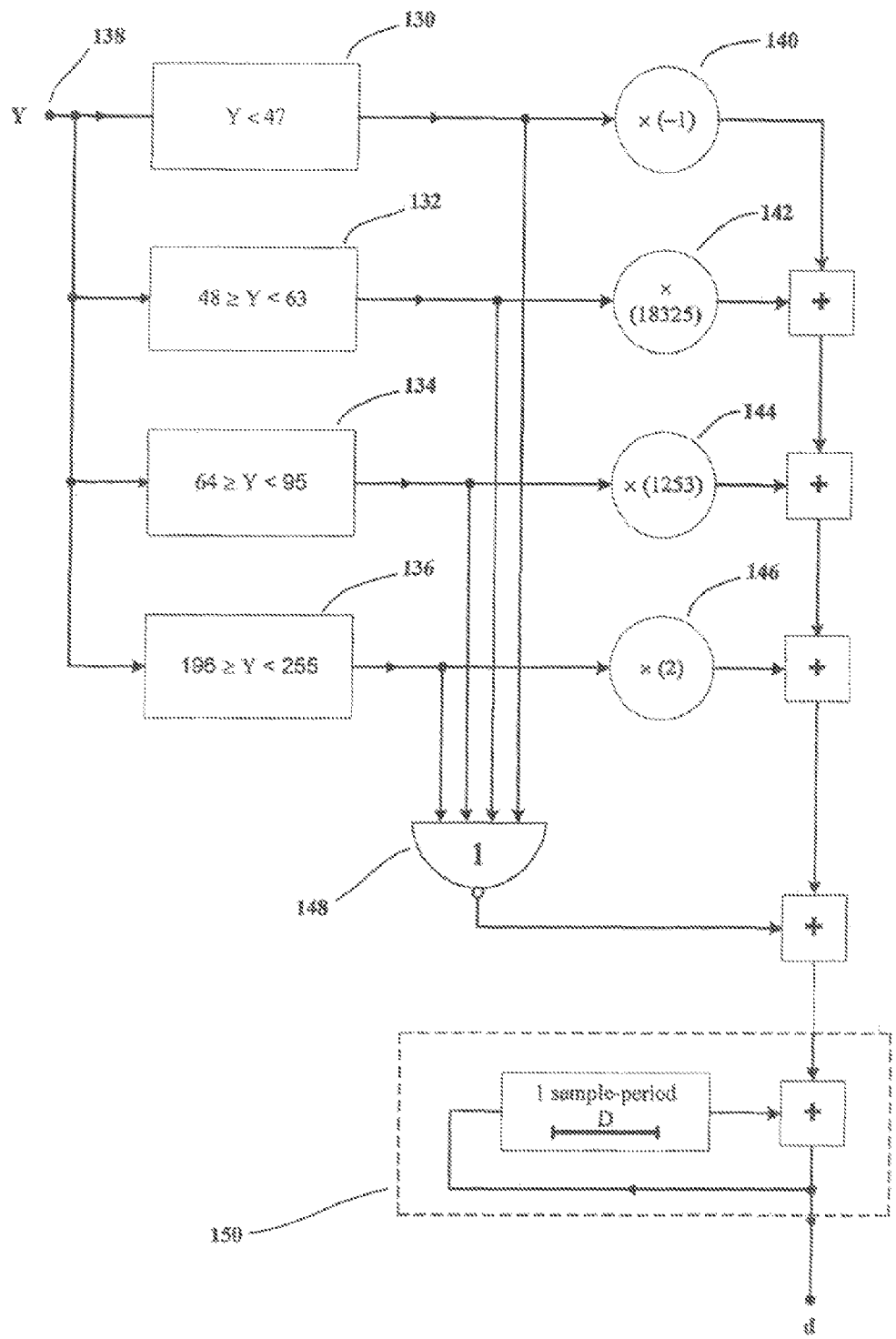
FIG. 3 is a block diagram showing an exemplary implementation of the invention.

A block diagram showing one possible implementation of the invention is shown in FIG. 3.

A plurality of comparators 130, 132, 134, 136 are provided and each comparator is coupled to an input 138 to receive input pixel luminance values from the input 138. The output of each comparator 130-136 is coupled to a respective multiplier 140, 142, 144, 146. In addition the outputs of the comparators may optionally be coupled, as shown in the exemplary embodiment, to a NOR gate 148 (which outputs a 1 if all inputs are 0, and a 0 if any input is 1). The output of the NOR gate 148, if present, and the output of the multipliers are coupled to accumulator 150 to form a cumulative total d output. The previous cumulative total d is also coupled to the accumulator 150 delayed by one sample delay D.

The skilled person will appreciate that other elements not necessary to an appreciation of the present embodiment have been omitted, for clarity.

Each comparator 130-136 has an assigned sample value range, and each comparator 130-136 outputs a "true" logic signal if the input image sample falls within the sample value range assigned to the comparator 130-136. In the exemplary embodiment the assigned sample value range for each comparator 130-136 is a pixel luminance value range, and the input image samples are pixel luminance values.

In the exemplary embodiment discussed above:

comparator 130 identifies input luminance samples where $Y<47$ comparator 132 identifies input luminance samples where $48<Y<63$ comparator 134 identifies input luminance samples where $64<Y<95$ comparator 136 identifies input luminance samples where $196<Y<255$ It should be noted that in some arrangements the pixel luminance value ranges assigned to the comparators 130-136 may be contiguous. In these arrangements the NOR gate 148 is unnecessary and may be omitted. In other arrangements, such as shown in the exemplary embodiment, the pixel luminance value ranges assigned to the comparators 130-136 are not contiguous. In these arrangements the use of a NOR gate 148 as shown in the exemplary embodiment ensures that the pixel luminance values outside the pixel value ranges associated with comparators 130-136 still contribute to the final analysis of the image data. However, the use of NOR gate 148 is not necessary and may be omitted even in the pixel luminance value ranges are not contiguous.

The multipliers 140-146 each have an assigned weight associated with the respective input sample range of the corresponding comparator 130-136, and the multipliers 140-146 output the weight value in response to a "true" logic signal output from the respective corresponding comparator 130-136.

In the exemplary embodiment discussed above, in response to a "true" logic level from the respective comparator:

multiplier 140 outputs a weight value −1;

multiplier 142 outputs a weight value +18 325;

multiplier 144 outputs a weight value +1 253;

multiplier 146 outputs a weight value +2.

In operation, an input pixel luminance value is supplied to each of the comparators 130-136 in parallel, and each comparator 130-136 compares the input pixel luminance value with the respective assigned pixel luminance value range. If the input pixel luminance value falls within the assigned pixel luminance value range of a comparator 130-136, the comparator 130-136 outputs a "true" logic signal, otherwise the comparator outputs a "false" logic signal.

As indicated above, if the pixel luminance value does not fall within any of the pixel luminance value ranges, the output of all comparators 130-136 is a "false" logic signal and a "true" logic signal is output from the NOR gate 148. Otherwise, the pixel luminance value will fall within the pixel luminance value range of one of the comparators 130-136 and the output of that comparator 130-136 will be a "true" logic signal.

In response to a "true" logic signal output from one of the comparators 130-136, a respective weight is generated by the corresponding multiplier 140-146 and is added to the previous cumulative value in accumulator 150 to form the cumulative value d.

When the sample value is not in any of the sample value ranges associated with the comparators 130-136, the output of all of the comparators will be a "false" logic level, in this case 0. This results in the output of the NOR gate 148 being 1 and this is accumulated in accumulator 150. This provides the contribution from optional count $N_4$ described above.

When all image samples have been received, for example at the end of a field, the cumulative value d may be compared with a threshold value in a comparator (not shown) to determine whether the image is black.

In the described embodiment of the invention, the threshold value is zero, the image is determined to be black where the cumulative value is negative. As will be apparent to a skilled person, the choice of the arbitrary constant T and the coefficient magnitude and sign will affect the choice of threshold value. More generally, therefore, a positive detection is made when the weighted sum for all sample values is less or more than the threshold value, if the weight assigned to the sample value range including the defined value therein is negative or positive, respectively.

In addition, advantageously previous images are taken into account and a final determination of black is not made until a number of successive fields or frames have been detected as being black.

In the described embodiments the cumulative value d is used to keep a running total of the discriminator function as the sample values are received or processed. However, as will be apparent to a skilled person, it would equally be possible to count the sample values in each sample value range and apply the signed weight to the final count.

In some applications of the invention to the detection of "black" images it is desirable for a numerical measure of the "blackness" of the image to be output. It also may be helpful for an operator to adjust the effective detection threshold to suit the type of images being processed. This could be done by evaluating the discriminator function of Equation 1 to provide a numerical output, and the threshold constant T in Equation 1 could be adjusted as required by the operator. However, these methods are not fully satisfactory and an alternative embodiment of the invention which provides these features will now be described.

If, in a system for the detection of "black" images, an equal positive offset is applied all the sample range boundaries, the likelihood of images being detected as "black" will be increased. A useful output parameter would be that offset value at which the detection result for a given image changes from "non-black" to "black". The lower the value of this offset the darker will be the image. In principle this could be done by evaluating the discriminator function for all possible offset values and analyzing the results; however this is usually impracticable—especially so in a system required to produce results quickly from real-time video sequences.

A feasible alternative in this situation is to evaluate the discriminator function three times, with three different offset values, for each image (e.g. each video field or frame) of the sequence, and to modify the offset values used to analyse each image in dependence upon the analysis of the previous image in the sequence. A block diagram of this method is shown in FIG. 4.

Figure 4:
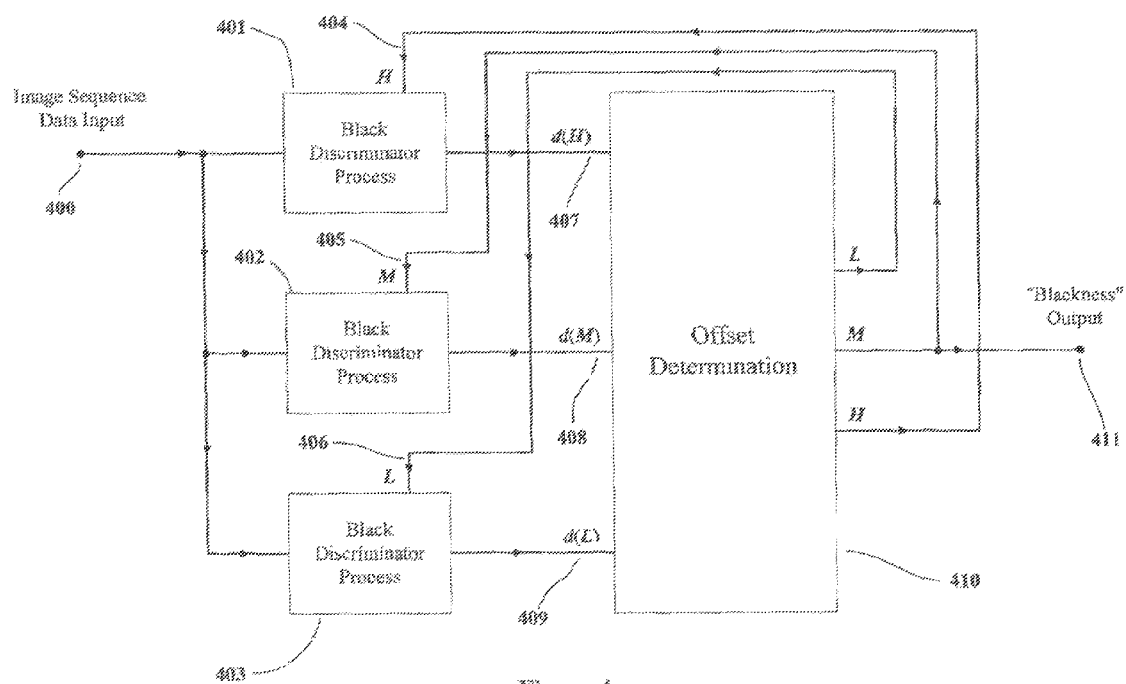
FIG. 4 is a block diagram showing a further exemplary implementation of the invention.

Referring to FIG. 4, data from a sequence of images (400) is input to three black discriminator processes (401), (402), and (403). Each of these processes evaluates the current image in the sequence according to Equation 1, with the threshold parameter T set to zero. The three processes are identical except that in each process the set of sample value ranges $N_j$ are modified by a positive offset value received on a respective sample offset value input (404) (405) (406).

The process (401) receives a high value offset H (404), the process (402) receives a middle value offset M (405) and the process (403) receives a low value offset L (406). In each process the offset value increases the upper and lower bounds of each of the sample value ranges (the widths of the ranges are not changed) so that lighter image data values (400) can occur and still be detected as black images. Depending on the sign of the respective result d (evaluated according to Equation 1), each process outputs a respective binary black/non-black output signals (407) (408) (409).

The discriminator outputs (407) (408) (409) are analyzed in an offset determination block (410), which adjusts the offset values used to analyse each image of the sequence in dependence upon the black/non-black signal (407), (408), (409) resulting from the analysis of the previous image in the sequence. The block (410) adjusts the offset values (as will be explained in detail below) so that the middle offset value M (405) is the offset value above which the current image is determined as black and below which the current image is determined as non-black. The middle offset value M is therefore a numerical indication of the "blackness" of the current image (blacker images corresponding to lower values) and it is output at the terminal (411).

The operation of the offset determination block (410) will now be described with reference to the flow chart FIG. 5. In this description the processing of pixel luminance values having the range zero to 255 will be assumed. The three offset values L, M and H are equally spaced, by an interval Δ so that:

$$L=M-\Delta$$

and $$H=M+\Delta$$

Figure 5:
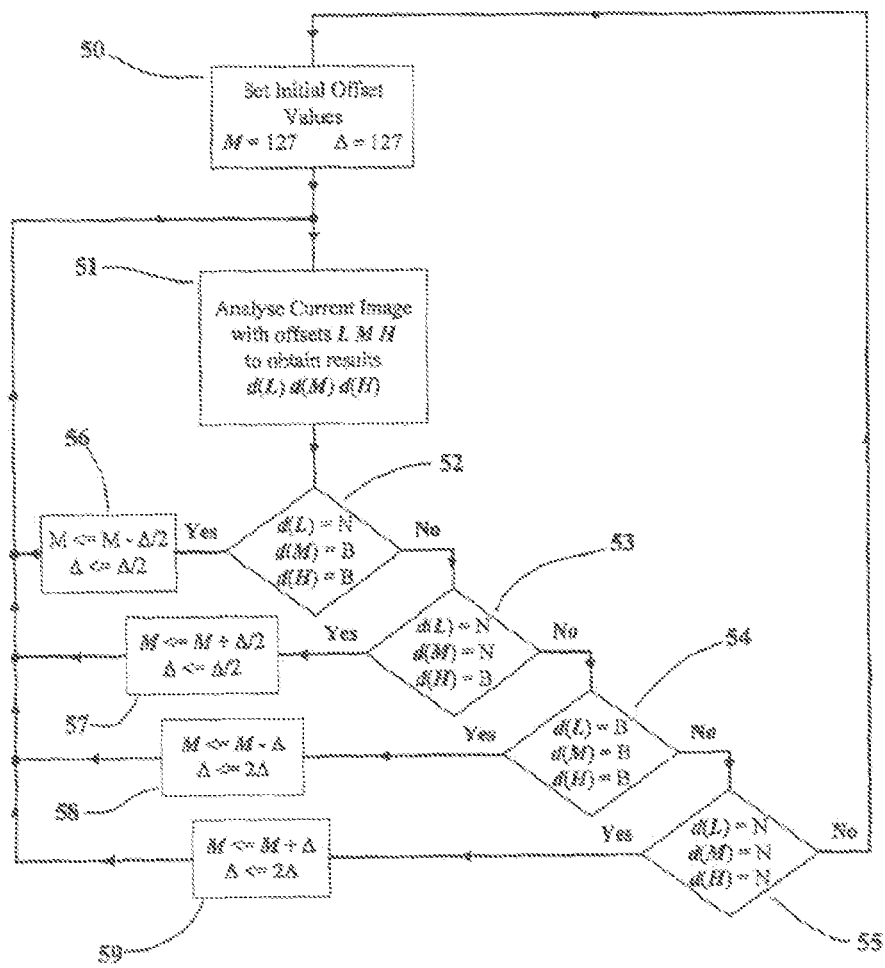
FIG. 5 is a flow chart illustrating the operation of the apparatus shown in FIG. 4.

Referring to FIG. 5, M and Δ are both set to 127 in an initial step (50); L will therefore be zero and H will be 254.

In step (51) the current image is analyzed three times according to Equation 1, using the three respective sample range offsets L, M and H to give respective black (B) or non-black (N) results d(L), d(M) and d(H). These results are analyzed in decision steps (52) (53) (54) (55).

If black is not detected in the process using the low offset value L but is detected in the processes using offsets M and H, step (56) subtracts half the current value of Δ from the current value of M, and then halves the current value of Δ. These modified values are used to define new values of L and H, which are used to analyse the next image of the sequence in the step (51).

If the only black result from step (51) is that using the high offset value H, step (57) adds half the current value of Δ to the current value of M and then halves the current value of Δ and these values are used to create the offsets for the analysis of the next image in step (51).

If all of the analyses in step (51) produce a black result, step (58) subtracts the current value of Δ from the current value of M and then double the current value of Δ and these values are used to create the offsets for the analysis of the next image in step (51).

If none of the analyses in step (51) produce a black result, step (59) adds the current value of Δ to the current value of M and then double the current value of Δ and these values are used to create the offsets for the analysis of the next image in step (51).

If none of the decision steps (52) (53) (54) (55) gives a positive result the values of M and Δ are re-initialised in Step (50) before analyzing the next image of the sequence in Step (51).

The result of the process shown in FIG. 5 is that, provided that most of the images in the sequence are similar to each other, the M value tends towards the critical offset value below which the current image is detected as non-black and above which the current image is detected as black.

There are some additional constraints which need to be applied to the process of FIG. 5 which will be apparent to the skilled person. For example, the offset values should be limited to the range zero to 255, and Δ should not exceed 127.

Some further processing of the M value is desirable to improve its usefulness as a measure of "Blackness". If all three results d(L), d(M) and d(H) indicate black and the value of L is zero then the reported "blackness" is set to maximum because it is almost certain that a dark image is being processed, and the value of M could be high and not representative of the image blackness. Also, values of M greater than 64 are likely to be unreliable as the image is again unlikely to be dark; in this case last value of M which was less than 64 is held as the output blackness measure until a new value of M less than 64 is found.

It may be helpful to map the values of M onto a different scale, possibly a non-linear scale with or without clipping of extreme values, prior to output as a blackness measure; and, the reliability of the output could be temporarily filtered, preferably with a recursive filter. Having obtained a numerical representation of the variation in "blackness" of the images in the sequence it is a simple matter to apply an operator-determined threshold value to the numerical result in order to obtain a binary result appropriate for the types of images being processed.

As will be apparent to a skilled person, the invention may be embodied in hardware or in software running on a suitable processor.

The present invention thus provides an advantageous method and apparatus for detection or fields or frames in film or video content with similar or substantially the same luminance or color component values.

Clearly many different arrangements can be envisaged embodying the inventive concepts described herein, and the invention is not intended to be restricted to the arrangements disclosed above.

The invention clamed is:

1. A method of analyzing sampled or sub-sampled image data to determine whether image data sample values are close to a black level, the method comprising the steps:
    defining a plurality of sample value ranges, wherein each of the sample value ranges has a signed weight assigned thereto and a sample value range including the black level has a weight of opposite sign from the weight assigned to at least one other sample value range;
    counting, by a processor, the number of samples having values within each said range and forming a weighted sum of the count values; and
    comparing, by the processor, the weighted sum with a threshold value to determine whether image data sample values are close to the black level.

2. The method according to claim 1, wherein the weight assigned to the sample value range nearest to, but not including, the black level has a weight of the same sign as the sample value range including the black level.

3. The method according to claim 1, wherein the weights having opposing sign to the weight associated with the sample value range including the black increase in magnitude with closer proximity of the associated sample value range to the black level.

4. The method according to claim 1, wherein the threshold value is zero.

5. The method as claimed in claim 1, wherein the weight assigned to the sample value range containing the black level is negative.

6. The method as claimed in claim 1, wherein the weighted sum is calculated from a representative set of samples from an image.

7. The method as claimed in claim 6, where the representative set of samples is pixels of a television picture field.

8. The method as claimed in claim 7, wherein successive odd- or even-television picture fields are analyzed.

9. The method according to claim 1, wherein image data from a sequence of images is analyzed and a positive decision is output only when a positive result is determined for each of a defined number of consecutive images in the said sequence.

10. The method as claimed in claim 1, where one or more of: the number of sample value ranges; the extent of the sample value ranges; the magnitude of the weight to be assigned to the sample value ranges; and the sign of the weight to be assigned to the sample value ranges are obtained from optimisation of a training sequence.

11. A computer-readable medium storing code adapted to implement a method in accordance with claim 1.

12. A method of analyzing sampled or sub-sampled image data to determine whether image data sample values are close to a defined value, the method comprising the steps of:
    forming, by a processor, a weighted sum from relative contributions from a plurality of image data sample value ranges, the relative contribution depending on the number of samples in the range and a signed weight associated with each sample value range, wherein a sample value range including the defined value therein has a negative weight and at least one other sample value range has a positive weight; and
    determining, by the processor, a positive result when the weighted sum is less than the threshold value.

13. The method according to claim 12, wherein the said image data is luminance data.

14. The method according to claim 12, wherein the said image data is primary color component data.

15. The method according to claim 12, wherein the said defined value is black level.

16. The method according to claim 12, wherein the said defined value is white level.

17. The method according to claim 12, wherein the said image data is color difference data.

18. The method according to claim 17, wherein the defined value represents zero color difference.

19. The method according to claim 12, wherein the positive weights increase in magnitude with closer proximity of the associated sample value range to the said defined value.

20. The method according to claim 12, wherein the threshold value is zero.

21. The method according to claim 12, wherein image data from a sequence of images is analyzed and a positive decision is output only when a positive result is determined for each of a defined number of consecutive images in the said sequence.

22. A computer-readable medium storing code adapted to implement a method in accordance with claim 12.

23. A method of analyzing sampled or sub-sampled image data to determine whether image data sample values are close to a defined value comprising the steps, for each image data sample, of:
- allocating the image data sample to one of at least three sample value ranges;
- accumulating, by a processor, a signed weight associated with the allocated sample value range to form a weighted sum, the weight associated with a sample value range including the defined value therein being of opposite sign from the weight assigned to at least one other sample value range; and
- determining, by the processor, a positive result when the weighted sum for all sample values is less or more than the threshold value, if the weight assigned to the sample value range including the defined value therein is negative or positive, respectively.

24. The method according to claim 23, wherein said defined value is black level.

25. The method according to claim 23, wherein the weight assigned to the sample value range nearest to, but not including, the defined value has a weight of the same sign as the sample value range including the defined value.

26. The method according to claim 23, wherein the weights having opposing sign to the weight associated with the sample value range including the defined value increase in magnitude with closer proximity of the associated sample value range to the said defined value.

27. The method as claimed in claim 23, wherein the weight assigned to the sample value range containing the defined value is negative.

28. The method according to claim 23, wherein image data from a sequence of images is analyzed and a positive decision is output only when a positive result is determined for each of a defined number of consecutive images in the said sequence.

29. A computer-readable medium storing code adapted to implement a method in accordance with claim 23.

* * * * *